United States Patent
Bai et al.

(10) Patent No.: US 10,339,469 B2
(45) Date of Patent: Jul. 2, 2019

(54) SELF-ADAPTIVE DISPLAY LAYOUT SYSTEM

(71) Applicant: SAP SE, Walldorf (DE)

(72) Inventors: Meilin Bai, Shanghai (CN); Xingtian Shi, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 777 days.

(21) Appl. No.: 14/920,908

(22) Filed: Oct. 23, 2015

(65) Prior Publication Data

US 2017/0116543 A1    Apr. 27, 2017

(51) Int. Cl.

| | |
|---|---|
| *G06N 5/02* | (2006.01) |
| *G06N 20/00* | (2019.01) |
| *H04L 29/08* | (2006.01) |
| *G06F 16/35* | (2019.01) |
| *G06F 16/93* | (2019.01) |
| *G06F 16/33* | (2019.01) |
| *G06F 16/335* | (2019.01) |
| *G06F 16/338* | (2019.01) |
| *G06F 3/14* | (2006.01) |
| *H04W 4/18* | (2009.01) |
| *G06F 3/048* | (2013.01) |
| *G09G 5/00* | (2006.01) |

(52) U.S. Cl.
CPC ............ *G06N 20/00* (2019.01); *G06F 3/048* (2013.01); *G06F 3/14* (2013.01); *G06F 16/334* (2019.01); *G06F 16/337* (2019.01); *G06F 16/338* (2019.01); *G06F 16/35* (2019.01); *G06F 16/93* (2019.01); *G09G 5/003* (2013.01); *H04L 67/306* (2013.01); *H04W 4/18* (2013.01); *G06N 5/02* (2013.01); *G09G 2370/027* (2013.01)

(58) Field of Classification Search
None
See application file for complete search history.

(56) References Cited

U.S. PATENT DOCUMENTS

| | | |
|---|---|---|
| 7,461,358 B2 | 12/2008 | Wu |
| 2003/0040850 A1 | 2/2003 | Najmi et al. |
| 2005/0177822 A1 | 8/2005 | Kuch et al. |
| 2012/0084292 A1 | 4/2012 | Liang et al. |

(Continued)

OTHER PUBLICATIONS

Devlin, Decision Support Systems, Advances in, Intech, 2010, pp. 1-352 (Year: 2010).*

(Continued)

*Primary Examiner* — Wilbert L Starks
(74) *Attorney, Agent, or Firm* — Klarquist Sparkman, LLP (57) ABSTRACT

A system for self-adaptive user reading preference learning and screen layout optimization for multi-media information is disclosed. The system is particular useful for devices with small display form factors, such as mobile devices. Data flow diagram (DFD) technique is used to represent a model of the screen layout for visualization. The system processes input information, which includes user information, device information, context information, and the news. The delivery news is filtered in the news processing system and presented to a user based the user's interest, whereas device information and context information, are also factors that take effect in the modeling.

20 Claims, 4 Drawing Sheets

(56) References Cited

U.S. PATENT DOCUMENTS

2014/0012799 A1    1/2014   Eberlein et al.
2014/0289640 A1    9/2014   Poornachandran et al.

OTHER PUBLICATIONS

Wikipedia, Vector space model, 2004, https://en.wikipedia.org/wiki/Vector_space_model.
David M. Blei et al., Latent Dirichlet Allocation, Journal of Machine Learning Research 3, 2003, http://jmlr.csail.mit.edu/papers/v3/blei03a.html.
Christopher D. Manning et al., Stemming and lemmatization, Introduction to Information Retrieval, 2008, Cambridge University Press, http://nlp.stanford.edu/IR-book/html/htmledition/stemming-and-lemmatization-1.html.

* cited by examiner

SELF-ADAPTIVE DISPLAY LAYOUT SYSTEM

TECHNICAL FIELD

The present disclosure relates to computer systems, and more specifically, to a framework for display layouts of multi-media information which adapts to a user's reading preferences.

BACKGROUND

With the advent of the information and mobility age, a plethora of information, such as news information, which includes multi-media information, are available via mobile devices. For example, text, pictures, audios, and videos are presented to a user on a mobile device. However, given the diversity of information presented, it is difficult for a user to sort through the information to get to the ones which the user is interested. Consequently; a user may spend unnecessary time before getting to the desired information. Furthermore, different mobile devices may have different size displays. The information presented may not fit the screen size. These various issues decrease user experience with respect to the presented information.

The present disclosure is directed to a display layout system which takes into consideration a user's preference as well as device parameters. Furthermore, the display layout system is self-adaptive to learn the user's preference.

SUMMARY

A framework for providing screen layout based on user preference topics is described herein. In accordance with one aspect, a computer-implemented method is performed by a computer system to provide the screen layout. The method includes providing a plurality of AT information documents to a user. A user profile of the user which includes the user's preferences is provided. The user profile contains user information, context information and device information. Based on the user's profile, the information documents are pre-processed to form N pre-processed information documents. The relevance of the N pre-processed information documents is calculated to determine similarity to the user profile. The N pre-processed information documents are sorted in descending order of similarity. The N pre-processed information documents are presented based on descending order of similarity to the user. The method includes performing self-adaptive learning and updating the user profile based on the self-adaptive learning.

In another aspect, a non-transitory computer readable medium having stored thereon program code is disclosed. The program code is executable by a computer to determine sentiments of users for topics. A user profile of the user is retrieved. The user profile includes the user's preferences and contains user information, context information and device information. The program code includes setting $t=0$; initializing Q table having entries (s, a) to 0 for each s and a, where s is astute and a is an action; and do forever which further includes retrieving a plurality of N information documents from the user, pre-processing the information documents based on the user's profile to form N pre-processed information documents, calculating relevance of the N pre-processed information documents to determine similarity to the user profile, sorting the N pre-processed information documents in descending order of similarity, initializing s, repeat until all s are processed and in on doing select an action a, receive immediate reward r, update Q table for s and a, and s<-s'. Do forever further includes presenting first M news, getting feedback by Observing behaviors, and updating the user profile.

In yet another aspect, a computer system for determining sentiments of users for topics is disclosed. The computer system includes an input module with an information unit having a plurality of N information documents from a user, and a user profile of the user which includes the user's preferences and contains user information, context information and device information. The computer system further includes a processing module with a pre-processor unit for pre-processing the information documents based on the user's profile to form N pre-processed information documents, and a processor unit which calculates the relevance of the N pre-processed information documents to determine similarity to the user profile, and sorts the N pre-processed information documents in descending order of similarity. The computer system further includes an output module which presents the N pre-processed information documents based on descending order of similarity to the user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework is provided for generating screen layouts on a display. The framework is self-adaptive to reading preferences of a user as it is based on a user's reading preference as well as size or form factor of the device display. The framework generates screen layouts of on-line information. The on-line information may include on-line multi-media information. Such information may include various types of on-line multi-media information. For example, on-line multi-media information may include news, blogs, tweets, search engine results or a combination thereof. Other types of on-line multi-media information may also be useful. Multi-media information may contain texts, audio, images, or videos.

In an exemplary embodiment, the framework generates screen layouts for on-line news information. For example, the framework generates screen layouts of on-line multi-media news information. On-line multi-media news information include numerous or diverse types of on-line multi-media news information, such as weather, sports, political, social as well as other types of news information.

As discussed, the framework is designed to take into account the form factor of the device display. For example, in a case of a small mobile device such as a mobile smart phone, the form factor is smaller than that of a non-mobile device, such as a desktop or a larger mobile device such as a laptop or a tablet. With a smaller form factor, it is even more important to provide a screen layout of information which is tailored to a user's reading preferences based on device parameters. For example, the framework provides a screen layout of on-line multi-media information, such as on-line multi-media news information which is tailored to a user's reading preferences based on device parameters.

In one implementation, the framework provides a screen layout of on-line information, such as on-line news information, which is individualized to a user. For example, the framework provides a screen layout of on-line information which is based on a user's interest, a user's device parameters and a user's context factors. Context factors, for example, may include time and location. Other types of context factors may also be useful. The framework utilizes feathers, such as user interface layout application (programming interfaces (UI APIs), to generate the screen layout. The screen layout displays information which is personalized to the user. For example, the display includes feathers which take into account various factors such as:

1) adjusting granularity of the information, including sub-topic of the text, clip of the video and audio, and part of the image based on the form factor of the screen;
2) displaying different media together for the user to better understand the information;
3) displaying the information using a layout which is friendly to user experience;
4) displaying the information based on the user's interest, including topic and format, such as text, image, video or others;
5) displaying the information based on implied user's interest, such as user behavior, including finger movement, click-through, time spent on a page, as well as other factors which indicate the user's interest;
6) displaying the information based on context information, such as time and location, which can affect the user's interests and browsing behaviors; and
7) displaying the information based on the user's preference as determined or implied from social networks of which the user is a member.

Furthermore, the various factors used in designing the layout based on the user's preference and device parameters may be updated in real-time based on the user's reading preference. For example, the display model may be an on-line model so that the user's reading preference is able to be updated in real time.

Figure 1:
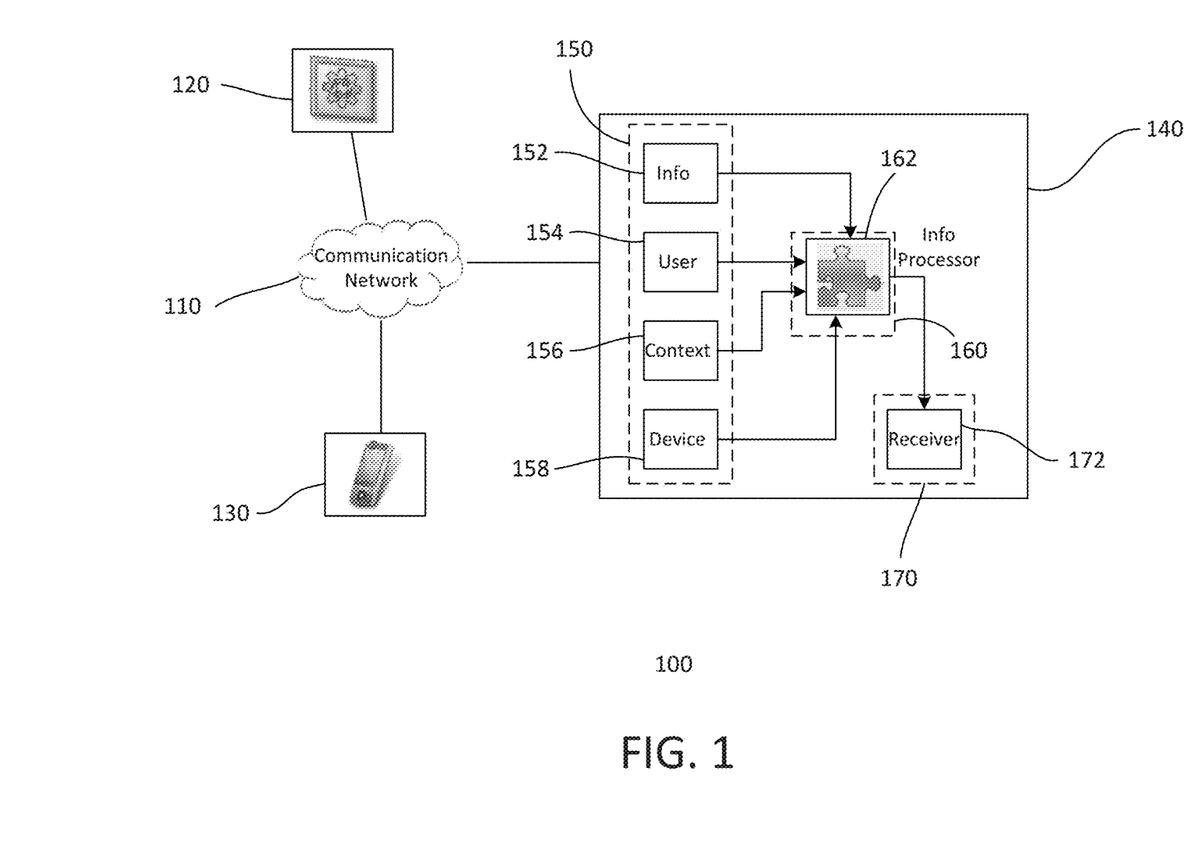
FIG. 1 shows a simplified diagram of an exemplary screen layout system.

FIG. 1 shows a simplified diagram of an exemplary environment 100. The environment 100, for example, includes an information layout generation system 140. The information layout system, for example, is located on a server connected to a communication network 110 and interacts with a user device 130. For example, the recommendation system may have a distributed architecture, such as a client-server architecture. Other types of architectures may also be useful.

A server may include one or more computers or servers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component. The computers or servers are connected through a communication network such as internet, intranet, local area network (LAN), wide area network (WAN) or a combination thereof. The servers, for example, are part of the same private network. The servers may be located in single or multiple locations.

As for the user device, it may be any local computing device with, for example, a local memory and a processor. The memory may be volatile or non-volatile types of non-transitory computer-readable media such as magnetic media, optical media, RAM, ROM, removable media, or any other suitable local or remote memory component. As shown, the end user device includes a smart phone device. Other types of processing devices may also serve as an end-user device. For example, the end-user device may be a personal computer (PC), a tablet PC, a workstation, a network computer or a mobile computing device, such as a laptop, or a tablet. Other types of processing devices may also be used. Illustratively, the environment includes one user device. It is to be understood, however, that the environment may include numerous user devices connected to the communication network. The user devices may be any type or combination of types of user devices. For example, the user devices may have different screen form factors.

As discussed, the various components of the network are connected through the communication network. For example, components of the network may be connected by internet. Other types of networks or network connections may also be useful. For example, the network connections may include a WIFI or a 3G/4G/LTE connection. In some cases, the network may be a cloud. A user may connect to the server using the user device. The user device may be referred to as the client side while the information layout generation system may be referred to as the server side. Other types of configurations may also be useful.

The layout generation system may be may be a web-based system. For example, a user may access the system using a browser on the user device. In other implementations, the layout generation system may be an application (App) loaded onto the user device. The App, when initiated, automatically connects to the server. The user may have a specific account in the layout generation system. For example, a user registers with the layout generation system after loading the App onto the user device. When connected to the server, the user logs into the account to which the user is associated. Logging in may be automatically or manually performed when connected to the system.

The layout generation system generates a layout of information. For example, the system generates a layout of on-line information obtained based on a user's reading preferences. The on-line information, for example, are obtained from one or more information servers 120 connected to the network, such as the internet. The information servers may contain on-line multi-media information, such as on-line multi-media news information. Other types of on-line information may also be useful.

As shown, the layout generation system includes an input module 150, a processing module 160 and an output module 170. Providing other modules for the layout generation system may also be useful. The various modules are employed to generate a layout, for example, of on-line multi-media information based on the user's preference and parameters of the user device.

In one embodiment, the input module includes an information unit 152, a user unit 154, a context unit 156 and a user device unit 158. The information unit retrieves information from the information server. For example, the information unit retrieves news information from one or more news sources on the internet. Retrieving other types of information may also be useful. The user unit contains user information. For example, user information may include a user identification (ID), social network accounts as well as a set of profiles or preferences. Preferences, for example, include reading interests, customizations, reading habits as well as other profile or preference information. The context unit contains context information. Context information includes, for example, time of request and location of the user. Other types of context information may also be useful. Context information may be Obtained from device functions, such as clock and global positioning system (GPS)/map functions. Context information may be refreshed when the App is started or when factors are changed. The device unit includes information of the device. For example, the device unit includes device parameters, such as display form factor, a device processor and a memory capacitor. Other types of device parameters may also be useful.

The user, context and device information units are used to form the user profile or preference information. User preferences may be initialized to be equal. For example, all preference factors are equal, such as all types of news are equally probable to be read by the user, regardless of context factors. Alternatively, a user may define the preferences. User preferences, in one embodiment, are updated through learning, such as, from user behavior.

The processor module includes an information processor unit 162. The information processor unit processes the information based on the various information contained in the user, context and device units of the input module. For example, the information processor processes the information in the information unit which has been retrieved from the information server. The processor module generates a layout of the information based on contents of the user, context and device units. For example, the layout takes into account user preferences from the user's profile, taking account context and device information.

In one embodiment, the processor module includes a learning unit (not shown). The learning unit updates the user profile. The user profile includes two main categories, such as a user's reading habit and a user's reading interest or preference. The user's reading habit relates to the pre-processing of the information. As for the user's reading interest, it relates to the learning unit. For example, the learning unit performs preference learning from the user's reading interest. The preference learning, for example, is from the information provided to the user. The preference learning is based on a user's behavior from the information provided to the user. The user's behavior is used to indicate the user's interest. For example, such behavior may include clicking, scrolling, bookmarking, saving page, following on hyperlink, amount of time spent on reading a type of information, as well as other types of behaviors indicating interest. The user's behavior is observed and the corresponding feedback is generated to update the user's profile.

Based on the user profile, filtered information including layout, is provided to the output module. For example, the filtered information is provided to the receiver unit 172 of the output module. The receiver unit, for example, serves as a storage for the filtered information. The filtered information is presented to the user on the end user device. For example, filtered information based on the user profile is presented.

As described according to one embodiment, the information layout generation system 140 resides on the server. The front end of the system or application resides on the end user device. An end user invokes the application on the end user device to initiate the process of providing filtered information to the user's device based on the profile of the user. The user's behaviors of handling the filtered information, such as clicking, scrolling, bookmarking, saving page, following on hyperlinks, reading time as well as other behaviors, are observed and the corresponding feedback is generated to update the user's profile. The learning process is a recursive and iterative procedure, which is realized by taking advantage of machine learning techniques of enhancement learning. The application, in one embodiment, is designed as an online learning model, which helps on updating user's interest to information, such as news information, immediately. Residing on the server advantageously provides higher processing power to process the information, which is transported between the end user device and server via, for example, the internet, such as a WiFi, mobile network.

Figure 2:
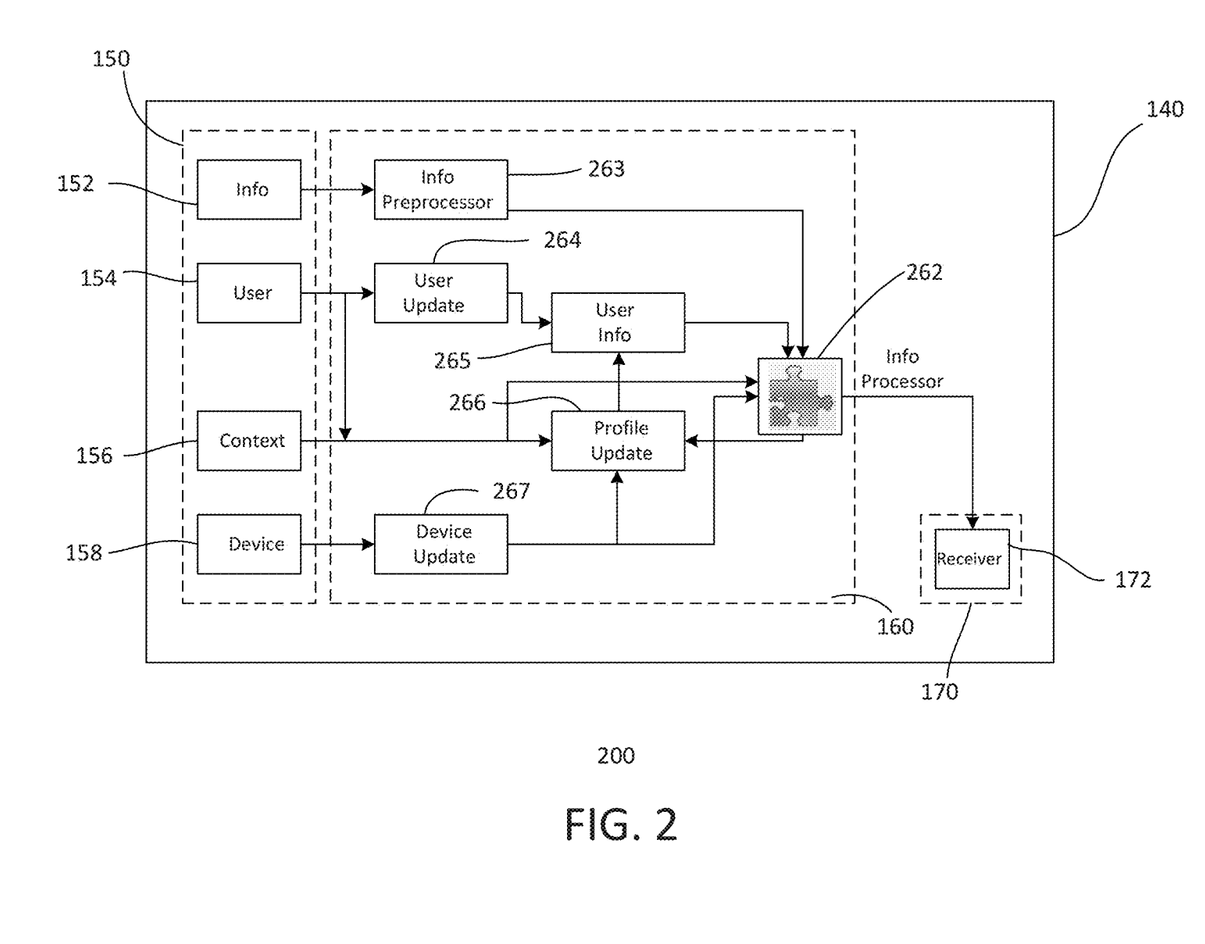
FIG. 2 shows the exemplary screen layout system in greater detail.

FIG. 2 shows an embodiment of a layout generation system 200 in greater detail. The layout generation system includes similar components as the generation system of FIG. 1. Common elements may not be described or described in detail.

As shown, the layout generation system 140 includes an input module 150, a processing module 160 and an output module 170. The input module includes various input units containing information employed by the processing module. In one embodiment, the input module includes an information unit 152, a user unit 154, a context unit 156 and a device unit 158. Providing the input module with other input units may also be useful.

The various input units, for example, may serve as a data source for the processing module. The data source, for example, may include a database. The database may be a relational database or Structured Query Language (SQL)-based database. In one embodiment, the database includes in-memory, such as SAP HANA database from SAP SE. Other types of databases may also be useful.

The information unit contains information retrieved from one or more websites on the internet server 120. In one embodiment, the information retrieved includes on-line multi-media information. In one embodiment, the information retrieved includes on-line multi-media news information. Other types of information may also be useful. The information may be retrieved regularly or upon user request. For example, a schedule may be used to retrieve information. In addition, a user may request information on an ad hoc basis. News information may be retrieved in its entirety or as a whole. For example, a news article is retrieved in its entirety, forming a news document.

The user unit contains user information. User information may include various types of user information. Such user information, for example, may include a user identification (user ID), information for various social networks as well as a user profile. The information unit may contain the website or websites from which to retrieve information. The user profile may include the user's reading interests, customs (preferences or behaviors), reading habits as well as other types of personal information. The user information may be provided by the user when registering with the layout generation system.

The context unit includes context information. Context information or factors, for example, includes time and location. Other types of context information may also be useful. Context factors, for example, are parameters for a user's profile. The user's profile may be different regarding different context factors. The context information may be obtained from the user device. For example, the context information may be accessed through clock and global positioning system (GPS) or location functions of the user device.

The device unit includes device information. For example, information regarding size or form factor of the device screen or display is included in the device unit. Other device parameters, such as processor type and speed, memory size or form factor, may also be included. The device information is obtained by accessing the device. For example, device information may be accessed from the system information function.

The processor module includes various processing units for processing information from the information unit of the input module. In one embodiment, the processing module includes an information pre-processor unit 263, a user update unit 264, a user update unit 265, a profile update unit 266, a device update unit 267 and an information processor unit 262. Providing other types of processing units may also be useful.

The pre-processor unit pre-processes retrieved information, such as news information. The information is retrieved from one or more news websites on the internet. The websites may be defined by the user or based on the user profile, such as from the user's social media accounts as well as inferred based on user behavior. Pre-processing, in one embodiment, includes formatting the retrieved information. Formatting includes, for example, adjusting news layout, news compression or extraction and scene restoration. Other types of formatting may also be useful. Furthermore, different types of information, such as text, image, audio, video or multi-media (a mixture of different types) are pre-processed using different techniques. In one embodiment, the information is categorized into different category types and different category types are formatted based on its category type. Pre-processing information is based on user profile information and category type. This increases processing efficiency and accuracy.

Text information may be formatted by resizing according to screen or display size. Formatting may also take into account a user's preferential text settings, such as font size, font style and line spacing. The size of a text information may also be taken into consideration for formatting. For example, text information may be compressed. Compressed text information may be presented in multiple pages. A user may view the information page by page easily by sliding the screen forwards or backwards to view the next or previous page. Such compression enables a user to navigate the text information easily. For example, a page menu bar enables a user to jump back and forth on the desired page by clicking or selecting the desired page number. Alternatively, text information may be presented in a single page. In such cases, a user may scroll up and down the document. Machine learning techniques, such as naïve Bayesian classifier and Dynamic Markov compression or other techniques, may be adopted to compress the text information. Such learning techniques may be based on user behavior or preference.

As discussed, formatting image information may include resizing according to the screen or display size. For example, the resolution and size of the image can be adjusted using image compression. An image may include its boundaries, such as the top, bottom, left, or right. The formatting may include minimizing the margins between the boundary of an image and descriptive text as well as compressing the text. Text compression may be based on the user's font preferences.

Audio and video information is pre-processed using audio/video compression and extraction techniques. Compressing audio and video information may be based on user preference or behavior. For example, advertising may be extracted or removed from the video if a user typically plays only the content of the video. Furthermore, if the user only typically plays the first 5 seconds of the video and jumps to the end, such behavior may be included in the formatting of the audio and video information. For example, granularity tuning may be performed on the audio and video information.

For multi-media information, it is pre-processed by using the combination of text, image and audio/video compression, as previously described. Furthermore, text associated with images, audio or video information is disposed proximately thereto. Additionally, the different types of media should not be located too closely to each other to avoid visual fatigue. Based on user preference, the audio and video information may be played automatically or only when selected by the user.

The processor module includes various processing units for processing information. As for the information processor unit, it processes information documents retrieved. For example, a document may be a news article. Other types of documents may also be useful. The information processor unit processes the information based on a user profile. For example, the information processor ranks documents in accordance with the user profile. The user profile takes into account the user's reading preference or interests, including formats. In one embodiment, the user profile takes into account context, such as time and location. For example, context factors may include working hours and weekends, indoors and outdoors. In one embodiment, the information processor is self-adaptive. For example, user behavior is monitored to update the user profile, including context and device information.

As indicated, a user profile indicates a user's preference to the information. For example, a user profile P indicates a user's preference for news topics of news documents. The user profile includes a series of weight vectors of feature terms. A profile weight vector is represented below as equation 1:

$$W_v = (w_{1,v}, w_{2,v}, \ldots w_{d,v}) \qquad \text{(Equation 1)}$$

where v is the index of the user profile, which is determined by context factors, $w_{1,v}$ is the weight of $i^{th}$ term in profile weight vector $W_v$, d is equal to the number of terms in the user profile, and $W_v$ is normalized to 1 ($\|W_v\|=1$).

As discussed, v is the index which is determined by context factors. If there are 20 context vectors, then there are 20 weight vectors. For example, $P=W_1, W_2, \ldots W_V$), where V is the number of context factors. Furthermore, all vectors have the same number of terms d. The number of terms d is equal to the number of terms in the user profile, which is determined by the number of features in a document.

For an information document, such as a news document, it may be represented with a document vector. A document vector X is shown in equation 2 below:

$$X_k = (x_{1,k}, x_{2,k}, \ldots x_{d,k})$$ (Equation 2)

where
k is to the $k^{th}$ document retrieved,
$x_{i,k}$ is the weight of $i^{th}$ term in document vector $X_k$, and $X_k$ is normalized to 1 ($\|X_k\|=1$).

Regarding $x_{i,k}$, it is the percentage that the $i^{th}$ term appears in the document with respect to all terms in the document.

The relevance or similarity of document k to the user profile P can be estimated using equation 3 below:

$$V_{p,k} = W \cdot X = \sum_{j=1}^{d} w_{j,p} x_{j,k}$$ (Equation 3)

where
j is the $j^{th}$ term of vectors W and X.

The system is self-adaptive. For example, the system or processor learns from the user's actions. In one embodiment, an agent senses the acts or actions in its environment. For example, the processor senses the acts or actions of its environment. For example, the user's behavior is sensed. The goals of the acts (user's behavior) are achieved. For example, the user's interest is achieved based on the acts of the user. A Q learning can be adapted. A learning function fir Q learning can be defined by equation 4.1 as follows:

$$Q(s,a)$$ (Equation 4.1)

where
Q(s, a) is the learning function,
s is the state defined as a pair of the user profile and the news to be filtered, and
a is defined as the action of presenting a specific news to the user.

The leaning function Q(s, a) can be determined using equation 4.2 below:

$$Q(s, a) = r + \gamma \max_{a'} Q(s', a')$$ (Equation 4.2)

where
r is the immediate reward taking action a at state s,
γ is the discount factor $0 \leq \gamma < 1$,
s' is the resulting state, and
a' is the candidate action on state s'.

Using equation 4.2, an optimal routine to the goal can be obtained for the action in state s when $$\pi(s) = \arg\max_{a} Q(s, a).$$

However, such an approach may risk overcommitting the high Q values during the early training since it lacks exploration. To balance exploitation (obtain high reward based on the known types of news) and exploration (find new kinds of news in accordance to the user's interest), an ε-greedy strategy may be employed. The ε-greedy strategy chooses action a=π(s) for state s. Equation 5 below shows π(s) as:

$$\pi(s) = \begin{cases} \arg\max_{a} \hat{Q}(s, a), & p > \varepsilon \\ a_{sn} \text{ or } a_{rand}, & p < \varepsilon \end{cases}$$ (Equation 5)

where
p is the random value uniformly distributed in [0, 1],
ε is the defined parameter,
$a_{sn}$ is the action selecting a news from a social network, and
$a_{rand}$ indicates selecting a low rank news randomly when there is no available news from the social network.

The parameter p is a uniform distribution probability for adopting the ε-greedy strategy. Furthermore, the reference to a social network is for exploration purposes to avoid risk of overcommitting Q.

Practically, we have no knowledge of the resulting state s'. Consequently, the values of the previous episode is employed for the iteration. Besides, it is the case of nondeterministic rewards and actions and equation 6 below may be employed:

$$\hat{Q}_{t+1}(s, a) = (1 - \alpha)\hat{Q}_t(s, a) + \alpha \left[ r_t + \gamma \max_{a'} \hat{Q}_t(s', a') \right]$$ (Equation 6)

where $$\alpha = \frac{1}{1 + \text{visit}(s, a)}$$

is the learning rate, and
r is the immediate reward for action a carried out in state s.

The variable r can be estimated from the feedback of the user's behavior.

In one embodiment, a user's behavior towards, for example, a news document, such as an average reading time for one word rt, following the hyperlink fl, searching word sw, bookmark bm, saving page sp, and scrolling sc can be used. In such a case, a behavior set B may be used to represent a user's behavior. For example, B={rt, fl, sw, bm, sp, sc}, and their corresponding contribution to the immediate reward r is f={$f_v$}, $b_v \in B$. The immediate reward is then defined by equation 7 below:

$$r = \sum_{v \in B} f_v b_v$$ (Equation 7)

Based on equation 7, the user profile can be updated using equation 8 below:

$$w_{i,p} = w_{i,p} + \sum_{k} \beta r_k I(x_{i,k})$$ (Equation 8)

where
β is the learning rate,
k is the overall presented news, and
$I(x_{i,k})$ is the threshold function for the contribution of news k to feature term i.

The threshold function I ($x_i$) can be defined by Equation 9 below:

$$I(x) = \begin{cases} 1, & x \geq \theta \\ 0, & x < \theta \end{cases} \quad \text{(Equation 9)}$$

where

θ is the threshold indicating that a term is updated if and only if it takes a large enough weight in the news.

After the profile is updated, it is normalized.

The pre-processed information may be stored in the receiver unit. The processor ranks the pre-processed documents based on the user profile. For example, the pre-processed documents are presented to the user on the end user device in the form of hyperlinks according to preference ranking. A hyperlink may be a title and abstract of a pre-processed document. When a user clicks on a hyperlink, the corresponding pre-processed document in the receiver unit is presented to the user on the end user device.

In one embodiment, M number of hyperlinks are presented to the user at a time, where M is a whole number less than the total number of pre-processed documents of the list. The value of M may be defined by the user or by the system. In some cases, a default value of M may be provided. The default value can be changed by the user.

Figure 3:
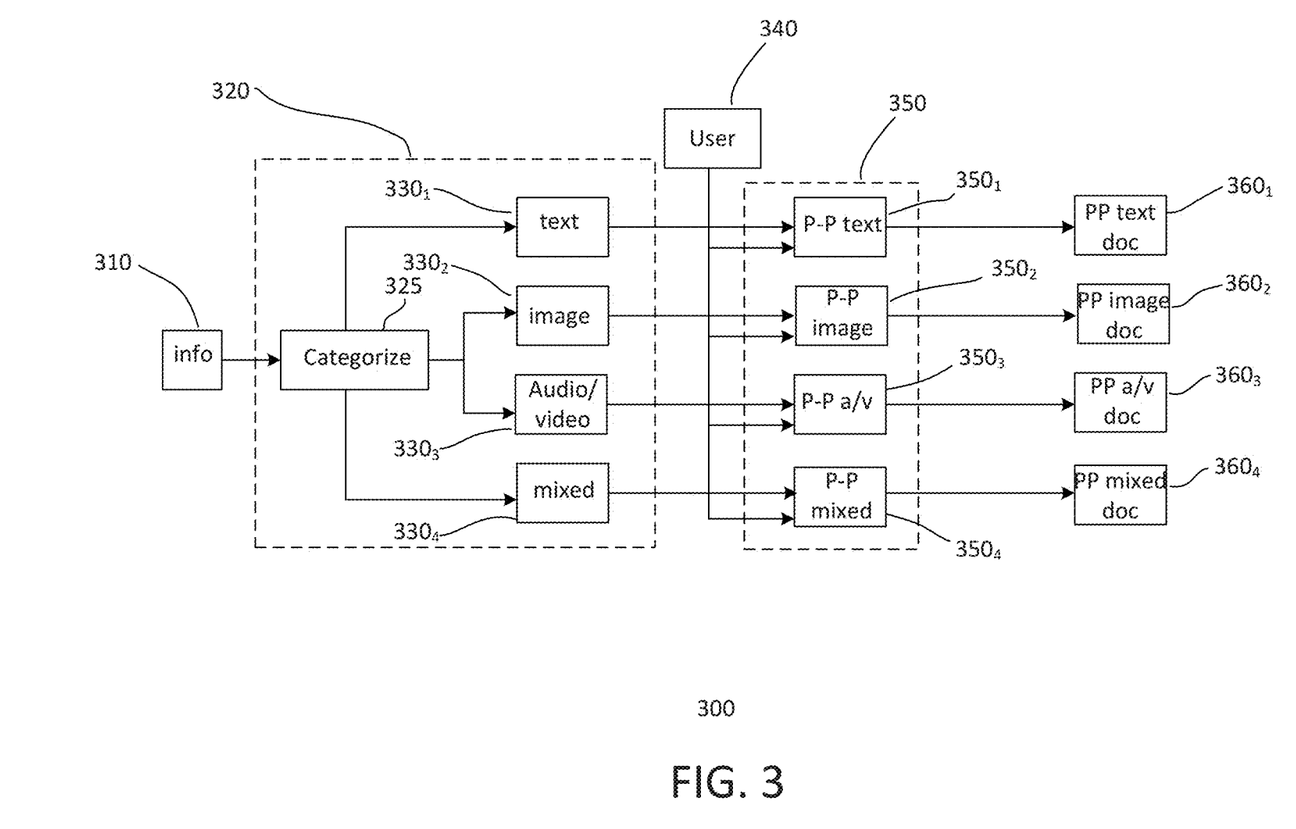
FIG. 3 shows an embodiment of a pre-processing flow.

FIG. 3 shows an embodiment of a pre-processing flow 300 for pre-processing retrieved information. The pre-processing, for example, is performed by a pre-processor module. The pre-processor may include a categorizer unit 320 and a pre-processor unit 350. Retrieved information 310 serves as an input and is categorized by the categorizer unit. For example, retrieved information documents are categorized based on type. In one embodiment, a retrieved document is analyzed at 325 and categorized as a text information document $330_1$, an image information document $330_2$, an audio and video information document $330_3$ or a mixed media information document $330_4$.

A document is pre-processed by the pre-processor unit according to document type and user preferences 340, such as a user's behavior. The behavior of the user may be learned and updated in the user profile as preferences in a user unit. The user preferences may be initially defined by the user and updated by subsequent behaviors of the user. Other techniques for obtaining user behaviors or preferences may also be useful.

For a text information document, it is pre-processed at $350_1$ to form a pre-processed text information document $360_1$ as an output. Pre-processing a text information document includes, for example, compressing text, adjusting font, such as type and size, adjusting page settings, such as line spacing and page breaks. Other types of text pre-processing may also be useful.

An image information document is pre-processed at $350_2$ to form a pre-processed image information document $360_2$ as an output. Pre-processing an image information document includes, for example, resizing, resolution adjustment as well as position arrangement. Furthermore, associated text may be pre-processed similarly as a text information document, such as text compression and font adjustments as well as location adjustment.

An audio and video information document is pre-processed at $350_3$ to form a pre-processed audio and video information document $360_3$ as an output. Pre-processing an audio and video information document includes, for example, resolution adjustment, granularity tuning as well as other types of preprocessing. If the audio and video information document includes text, it may be pre-processed similarly as text in an image information document.

A mixed media information document is pre-processed at $350_4$ to form a pre-processed mixed media information document $360_4$ as an output. The pre-processing is performed using, for example, a combination of text, image and audio/video pre-processing. Furthermore, mixed media pre-processing includes position arrangement of the different types of media. For example, text associated with images, audio or video information is disposed proximately thereto. Additionally, the different types of media should not be located too closely to each other to avoid visual fatigue. Based on the user preference, the audio and video information may be played automatically or only when selected by the user. Other types of pre-processing techniques for a mixed media information document may also be useful.

The pre-processed documents may be stored in the receiver unit. As discussed, the receiver unit may serve as a storage for the pre-processed documents for presentation to the user on the end user device.

Figure 4:
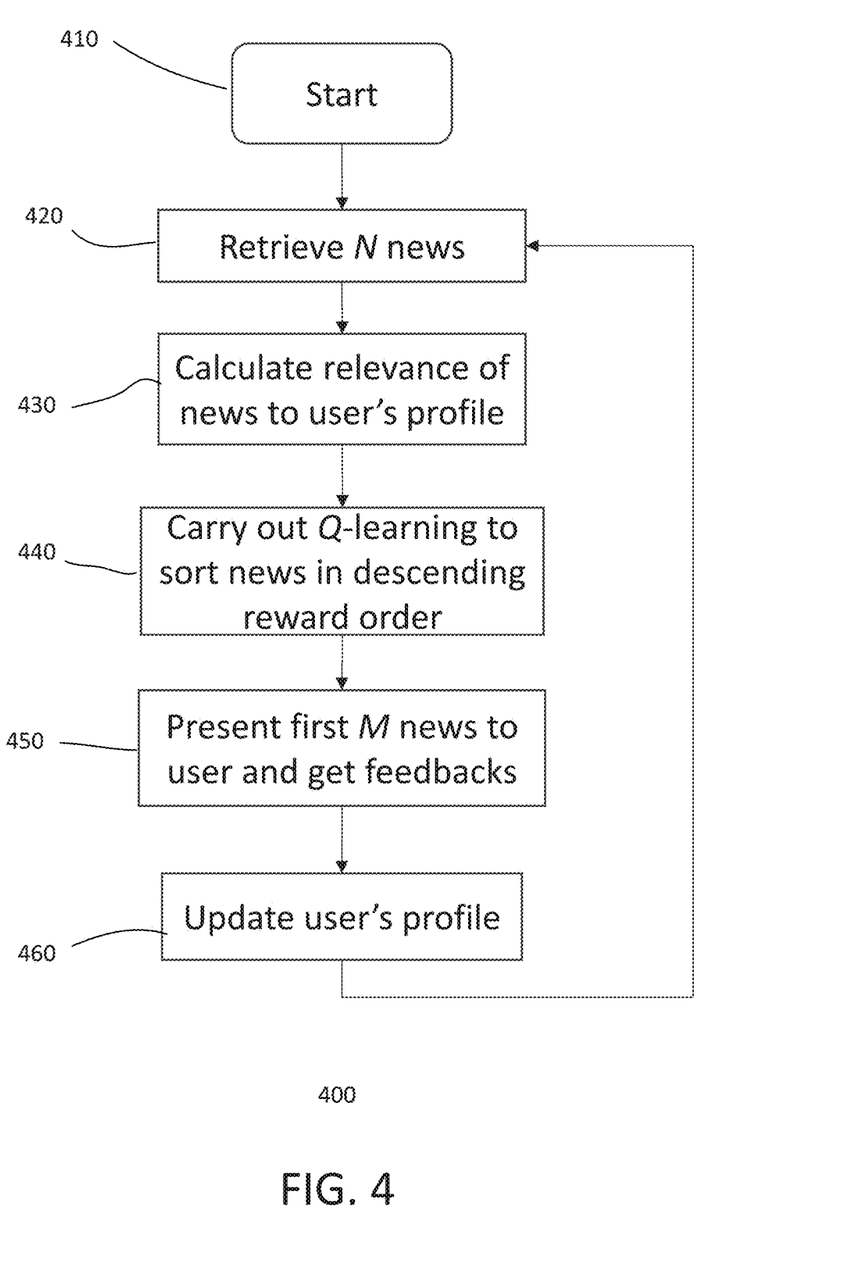
FIG. 4 shows an embodiment of a learning preference flow.

FIG. 4 shows an embodiment of a preference learning process 400. When initiated at step 410, information documents are retrieved at step 420. The information documents, for example, include news information documents. The documents may be retrieved from one or more websites on the internet. In one embodiment, N information documents are retrieved. The information documents are retrieved and processed to determine their relevance to the user's profile at step 430. For example, an information document is processed to generate a document vector according to Equation 2. The relevance of the document is determined according to Equation 3. The documents may be processed one document at a time.

The documents are presented to the user based on descending reward order using)-learning at step 440. For example, the documents are presented from highest reward order to the lowest. This is performed using, for example, Equations 4.1, 4.2, 6 and 7. In one embodiment, Q-learning employs an ε-greedy strategy according to Equation 5. The first M documents are presented to the user and the system monitors user behavior for feedback at step 450, where M is a whole number greater or equal to 1 and less than N. The variable M may be defined by the user or is a global parameter defined by the system or a combination thereof. In one embodiment, a document is presented in the form of a hyperlink (e.g., document title and abstract).

The user's profile is updated at step 460. For example, the profile is updated according to Equations 8 and 9. The updating of the user profile may be performed after all documents have been reviewed. For example, the profile is updated after the user exits the application. Alternatively, the profile may be updated the next time the user fetches information, such as when the application is invoked.

A pseudo-code of an embodiment of the learning process is shown below:

Get saved user profile, set t←0
For each s, a, initialize the table entry Q(s, a) to 0
Do forever:
    Retrieve N news form news resource and social network
    Pre-process news
    Calculate relevance of news to user profile and sort in descending order by similarity
    Initialize s
    Repeat
        Select an action a using Equation 5
        Receive immediate reward r Update the table entry for (Q(s, a) as Equation 6

$s \leftarrow s'$

Until s is terminal
Present first M news
Get the feedback by observing user behaviors
Update the user profile $t \leftarrow t+1$ As discussed, document or news document retrieval is based on the user's profile, and the N news obtained are then sorted by their similarity to the user profile, which means that the news at episode t and t−1 have large similarity, and assures that in Q learning we can take the immediate reward as the feedback of the user at last episode, and Q value at last episode as well. Afterwards, Q teaming is processed. At first, there is no news filtered, and s is nil. From this state, the 0 learning procedure chooses action a rendering maximum Q(s,a) successively, or fetching news from social network, until all news are added. As illustrated before, the immediate reward r and the 0 function after action a are both from the last episode, i.e., t−1. Next, M (M<N) news are presented to the user, and thereafter the user's behavior is observed. By calculating the feedback from the user, his/her behavior is updated, and one episode is completed. After enough iterations, Q function will converge, and consequently the user's profile is estimated.

If the user's interests change, then his/her behavior to the presented news change accordingly. Then the immediate rewards alter, and Q function evolves. In other words, as it is an online model, this strategy can adapt to the user's preference effectively.

As described, the various modules of the evaluation system may be embodied as an application. For example, the various modules may be embodied as a software application. The modules may be integrated into a client/server or stand-alone software application. The source code or codes of the application may be compiled to create an executable code. The codes, for example, may be stored in a storage medium such as one or more storage disks. Other types of storage mediums may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method performed by a computer system to provide screen layout based on user preference topics comprising:
   providing by the computer system a plurality of N information documents to a user;
   providing to the computer system a user profile of the user, wherein the user profile includes the user's preferences, wherein the user profile contains user information, context information and device information;
   pre-processing by the computer system the information documents based on the user's profile to form N pre-processed information documents comprising a plurality of one or more of the following document types:
      a text type information document,
      an image type information document,
      an audio and video type information document, or
      a mixed media type information document,
   wherein:
      pre-processing to form the text type information document comprises compressing text information, resizing according to device information, adjusting font and page breaks based on the user information or a combination thereof;
      pre-processing to form the image type information document comprises resizing the image based on the device information, reducing margins between the image and associated text, compressing the associated text, adjusting the font based on the user information or a combination thereof;
      pre-processing to form the audio and video type information document comprises compressing audio and video using audio/video compression which include granularity tuning based on the user information; and
      pre-processing to form the mixed media type information document comprises a combination of text, image and audio and video pre-processing including position arrangement of the different media;
   evaluating relevance of the N pre-processed information documents to determine similarity to the user profile;
   sorting the N pre-processed information documents in descending order of similarity;
   presenting by the computer system for display on an end user device the N pre-processed information documents based on descending order of similarity to the user;
   performing self-adaptive learning; and
   updating by the computer system the user profile based on the self-adaptive learning.

2. The computer-implemented method of claim 1 wherein N information documents comprises N news documents.

3. The computer-implemented method of claim 1 wherein the user profile (P) comprises:

$P=(W_1, W_2, \ldots W_V)$, where

V is the number of context factors, and
$W_V$ is a profile weight vector; and $W_v=(w_{1,v}, w_{2,v}, \ldots w_{d,v})$, where v is the index of the user profile, which is determined by context factors,
$w_{1,v}$ is the weight of $i^{th}$ term in profile vector $W_v$,
d is equal to the number of terms in the user profile, and
$W_v$ is normalized to 1 ($\|W_v\|=1$).

4. The computer-implemented method of claim 3 wherein the N information documents are represented by N document vectors, wherein a document vector comprises $X_k=(x_{1,k}, x_{2,k}, \ldots x_{d,k})$, where
   k is to the $k^{th}$ document retrieved, and k is from 1 to N,
   $x_{i,k}$ is the weight of $i^{th}$ term in document vector $X_k$, and
   $X_k$ is normalized to 1 ($\|X_k\|=1$).

5. The computer-implemented method of claim 4 wherein the relevance comprises:

$$V_{p,k} = W \cdot X = \sum_{j=1}^{d} w_{j,p} x_{j,k}$$

where
j is the $j^{th}$ term of vectors W and X.

6. The computer-implemented method of claim 1 wherein the self-adaptive learning comprises:
   observing actions of the user to get feedback; and
   updating the user profile based on the feedback.

7. The computer-implemented method of claim 1 wherein the self-adaptive learning employs a Q learning function comprising:

$$Q(s, a) = r + \gamma \max_{a'} Q(s', a')$$

where
- s is the state defined as a pair of the user profile and the news to be filtered,
- a is defined as the action of presenting a specific news to the user,
- r is the immediate reward taking action a at state s,
- γ is the discount factor 0≤γ<1,
- s' is the resulting state, and
- a' is the candidate action on state s'.

8. The computer-implemented method of claim 7 wherein the Q learning function employs an E-greedy strategy which chooses action a=π(s) for state s comprising:

$$\pi(s) = \begin{cases} \operatorname{argmax}_a \hat{Q}(s, a), & p > \varepsilon \\ a_{sn} \text{ or } a_{rand}, & p < \varepsilon \end{cases}$$

where
- p is the random value uniformly distributed in [0, 1],
- ε is the defined parameter,
- $a_{sn}$ is the action selecting a news from a social network, and
- $a_{rand}$ indicates selecting a low rank news randomly when there is no available news from the social network.

9. The computer-implemented method of claim 8 wherein $$\hat{Q}_{t+1}(s, a) = (1-\alpha)\hat{Q}_t(s, a) + \alpha\left[r_t + \gamma \max_{a'} \hat{Q}_t(s', a')\right]$$

where $$\alpha = \frac{1}{1 + \operatorname{visit}(s, a)}$$

is the learning rate, and
r is the immediate reward for action a carried out in state s.

10. The computer-implemented method of claim 9 wherein r takes into account the user's behavior B which comprises:
- average reading time for one word rt,
- following a hyperlink fl,
- a search word sw,
- bookmarking bm,
- saving page sp, and
- scrolling sc, or
- a combination thereof.

11. The computer-implemented method of claim 10 wherein $$r = \sum_{v \in B} f_v b_v.$$

12. The computer-implemented method of claim 11 wherein updating the user profile comprises:

$$w_{i,p} = w_{i,p} + \sum_k \beta r_k I(x_{i,k}),$$

where
- β is the learning rate,
- k is the overall presented news, and
- $I(x_{i,k})$ is the threshold function for the contribution of news k to feature term i.

13. The computer implemented method of claim 1, wherein the performing self-adaptive learning comprises:
observing user behavior comprising a plurality of sensed user actions selected from the group of:
average reading time for a given word,
following a hyperlink,
searching a word,
bookmarking,
saving a page, and
scrolling;
learning user preference based on the observed user behavior; and
generating user preference feedback representing the determined user preferences.

14. The computer implemented method of claim 13, wherein the updating the user profile is performed in real-time based on the generated user preference feedback.

15. The computer implemented method of claim 14, wherein the updated user profile is utilized to provide a filtered set of information documents to the user.

16. A non-transitory computer-readable medium having stored thereon program code, the program code executable by a computer to determine sentiments of users for topics comprising:
retrieving by the computer a user profile of the user, wherein the user profile includes the user's preferences, wherein the user profile contains user information, context information and device information;
setting t=0;
initializing a Q table having entries (s, a) to 0 for each s and a, where s is a state and a is an action; and
do forever
retrieving a plurality of N information documents from the user,
pre-processing by the computer the information documents based on the user's profile to form N pre-processed information documents comprising a plurality of one or more of the following document types:
a text type information document,
an image type information document,
an audio and video type information document, or
a mixed media type information document,
wherein:
pre-processing to form the text type information document comprises compressing text information, resizing according to device information, adjusting font and page breaks based on the user information or a combination thereof;
pre-processing to form the image type information document comprises resizing the image based on the device information, reducing margins between the image and associated text, compressing the associated text, adjusting the font based on the user information or a combination thereof;

pre-processing to form the audio and video type information document comprises compressing audio and video using audio/video compression which include granularity tuning based on the user information; and pre-processing to form the mixed media type information document comprises a combination of text, image and audio and video pre-processing including position arrangement of the different media, evaluating relevance of the N pre-processed information documents to determine similarity to the user profile, sorting the N pre-processed information documents in descending order of similarity, initializing s, repeat until all s are processed,
  select an action a,
  receive immediate reward r,
  update Q table for s and a, and s<-s', presenting by the computer for display on an end user device first M news, getting feedback by observing behaviors using the computer, and updating by the computer the user profile.

17. A computer system for determining sentiments of users for topics comprising:

an input module, the input module includes
  an information unit having a plurality of N information documents from a user, and
  a user profile of the user, wherein the user profile includes the user's preferences, wherein the user profile contains user information, context information and device information;

a processing module, the processing module includes
a pre-processor unit for pre-processing the information documents based on the user's profile to form N pre-processed information documents comprising a plurality of one or more of the following document types:
  a text type information document,
  an image type information document,
  an audio and video type information document, or
  a mixed media type information document, wherein the pre-processing comprises:
  pre-processing to form the text type information document comprises compressing text information, resizing according to device information, adjusting font and page breaks based on the user information or a combination thereof;

pre-processing to form the image type information document comprises resizing the image based on the device information, reducing margins between the image and associated text, compressing the associated text, adjusting the font based on the user information or a combination thereof;

pre-processing to form the audio and video type information document comprises compressing audio and video using audio/video compression which include granularity tuning based on the user information; and pre-processing to form the mixed media type information document comprises a combination of text, image and audio and video pre-processing including position arrangement of the different media, and a processor unit, the processor unit
  evaluates relevance of the N pre-processed information documents to determine similarity to the user profile, and
  sorts the N pre-processed information documents in descending order of similarity; and an output module, the output module presents for display on an end user device the N pre-processed information documents based on descending order of similarity to the user.

18. The computer system of claim 17 wherein the processor module comprises:
  a learning unit for performing self-adaptive learning; and
  an update unit for updating the user profile based on the self-adaptive learning.

19. The computer system of claim 18 wherein:
  the learning unit observes actions of the user to get feedback; and
  the update unit updates the user profile based on the feedback.

20. The computer system of claim 18 wherein the self-adaptive learning unit employs a Q learning function comprising $$Q(s, a) = r + \gamma \max_{a'} Q(s', a')$$

where
  s is the state defined as a pair of the user profile and the news to be filtered,
  a is defined as the action of presenting a specific news to the user,
  r is the immediate reward taking action a at state s,
  $\gamma$ is the discount factor $0 \leq \gamma < 1$,
  s' is the resulting state, and
  a' is the candidate action on state s'.

* * * * *